United States Patent
Randriamasy et al.

(10) Patent No.: US 9,832,703 B2
(45) Date of Patent: Nov. 28, 2017

(54) OPTIMIZATION OF APPLICATION LAYER TRAFFIC CARRIED BY AN IP CONNECTION OVER A MOBILE NETWORK

(71) Applicant: ALCATEL-LUCENT, Boulogne-Billancourt (FR)

(72) Inventors: Sabine Claire Randriamasy, Nozay (FR); Telemaco Melia, Rolle (CH)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 14/773,819

(22) PCT Filed: Mar. 11, 2014

(86) PCT No.: PCT/EP2014/054687
§ 371 (c)(1),
(2) Date: Sep. 9, 2015

(87) PCT Pub. No.: WO2014/140003
PCT Pub. Date: Sep. 18, 2014

(65) Prior Publication Data
US 2016/0029287 A1  Jan. 28, 2016

(30) Foreign Application Priority Data
Mar. 12, 2013  (EP) .................... 13305278

(51) Int. Cl.
*H04W 4/00* (2009.01)
*H04W 40/00* (2009.01)
(Continued)

(52) U.S. Cl.
CPC ........... *H04W 40/00* (2013.01); *H04L 45/125* (2013.01); *H04L 45/306* (2013.01);
(Continued)

(58) Field of Classification Search
None
See application file for complete search history.

(56) References Cited

U.S. PATENT DOCUMENTS 8,924,508 B1* 12/2014 Medved ............ H04L 29/08072
709/217
2011/0202651 A1* 8/2011 Hilt ..................... H04L 67/1072
709/224
(Continued)

FOREIGN PATENT DOCUMENTS

JP  2012147155 A  8/2012
JP  2013509125 A  3/2013
(Continued)

OTHER PUBLICATIONS

D. Munaretto,"Online path selection for video delivery over cellular networks", Globecom Workshops (GC WKSHPS), 2012 IEEE, Dec. 3, 2012 (Dec. 3, 2012), 6 pages.
(Continued)

Primary Examiner — Kodzovi Acolatse
(74) Attorney, Agent, or Firm — Harness, Dickey & Pierce, P.L.C.

(57) ABSTRACT

In an embodiment, there is provided a method for optimization of application layer traffic carried by an IP connection over a multi-access technology mobile network between a User Equipment UE and an IP connection endpoint in an IP network, the optimization being based on network information provided using a network information service, the network information including path costs capable of indicating preferences in terms of network paths for the IP connection, the preferences in terms of network paths including preferences in terms of access technologies.

13 Claims, 6 Drawing Sheets

(51) Int. Cl.
H04L 12/729 (2013.01)
H04W 40/02 (2009.01)
H04L 12/725 (2013.01)
H04L 29/12 (2006.01)
H04L 29/08 (2006.01)
H04L 29/06 (2006.01)
H04W 88/02 (2009.01)

(52) U.S. Cl.
CPC ...... *H04L 61/2007* (2013.01); *H04L 67/1023* (2013.01); *H04L 67/42* (2013.01); *H04W 4/00* (2013.01); *H04W 40/02* (2013.01); *H04W 88/02* (2013.01)

(56) References Cited

U.S. PATENT DOCUMENTS

| | | | | |
|---|---|---|---|---|
| 2011/0295942 | A1* | 12/2011 | Raghunath | H04L 45/00 709/203 |
| 2011/0295983 | A1* | 12/2011 | Medved | H04L 45/00 709/220 |
| 2012/0144066 | A1* | 6/2012 | Medved | H04L 45/02 709/242 |
| 2012/0281621 | A1* | 11/2012 | Lotfallah | H04L 12/145 370/328 |
| 2012/0317293 | A1* | 12/2012 | Gu | H04L 45/126 709/226 |
| 2015/0289203 | A1* | 10/2015 | Zhang | H04W 64/006 455/436 |

FOREIGN PATENT DOCUMENTS

| | | |
|---|---|---|
| JP | 2015501571 A | 1/2015 |
| WO | WO-2011100269 A1 | 8/2011 |
| WO | WO-2012004513 A1 | 1/2012 |
| WO | WO-2012068304 A1 | 5/2012 |

OTHER PUBLICATIONS

"3rd Generation Partnership Project; Technical Specification Group Services and System Aspects; Feasibility study on IP Multimedia Subsystem (IMS) based peer-to-peer content distribution services; Stage 2 (Release 12)", Jun. 22, 2012 (Jun. 22, 2012), 41 pages.

M. Stiemerling, ALTO Deployment Considerations; draft-ietf-alto-deployments-06.txt11, ALTO Deployment Considerations; draft-ietf-alto-deployments-06.txt, Internet Engineering Task Force, IETF; Standardworkingdraft, Internet Society (ISOC)4, Rue Des Falaises CH—1205, Geneva, Switzerland, Feb. 25, 2013 (Feb. 25, 2013), 46 pages.

Dulinski Jagiellonian University P Wydrych R Stankiewicz AGH University of Science and Technology Z, Inter-ALTO Communication Problem Statement; draft-dulinski-alto-inter-problem-statement-0I.txt11, Jul. 11, 2011 (Jul. 11, 2011), 15 pages.

S. Randriamasy,Multi-Cost ALTO; draft-randriamasy-alto-multi-cost-07.txt 11 , Oct. 19, 2812 (Oct. 19, 2012), 37 pages.

International Search Report PCT/ISA/210 for International Application No. PCT/EP2014/054687 dated May 21, 2014.

Written Opinion of the International Searching Authority PCT/ISA/237 for International Application No. PCT/EP2014/054687 dated May 21, 2014.

\* cited by examiner

OPTIMIZATION OF APPLICATION LAYER TRAFFIC CARRIED BY AN IP CONNECTION OVER A MOBILE NETWORK

This application is a national phase under 35 U.S.C. §371 of PCT International Application No. PCT/EP2014/054687 which has an International filing date of Mar. 11, 2014, which claims priority to European patent application number EP 13305278.7 filed Mar. 12, 2013, the entire contents of each of which are hereby incorporated by reference.

The present invention generally relates to communications in general, and more particularly communications over mobile networks.

Detailed descriptions of mobile networks and systems can be found in the literature, such as in particular in Technical Specifications published by standardisation bodies such as for example 3GPP ($3^{rd}$ Generation Partnership Project).

An example of mobile communication system is Evolved Packet System EPS, specified in particular in 3GPP TS 23.401 and 3GPP TS 23.402. In a system such as for example EPS, a mobile terminal also called User Equipment (UE) has access to an external network such as IP network (also called Packet Data Network PDN) via a mobile network also called LTE network. The LTE network is a multi-access technology mobile network. The LTE network includes Evolved Packet Core EPC that can be accessed by multiple accesses including 3GPP accesses (such as E-UTRAN or GERAN/UTRAN) and non-3GPP accesses (such as trusted WiFi or non-trusted WiFi).

A PDN connection, such as in particular IP connection, may be established between a User Equipment having access to an IP network (such as for example the Internet) via a mobile network such as for example LTE network, and an IP connection endpoint in said IP network. Traffic related to various applications may be carried by such IP connection. Some applications, such as for example peer-to-peer (P2P) and content delivery, allow a choice in connection endpoints. Services such as for example the Application Layer Traffic Optimization (ALTO) service can be used for e.g. connection endpoint selection, in order to e.g. increase locality of traffic, improve user-experience, amongst others. More detail on ALTO service and protocol can be found for example in ALTO protocol, [draft-ietf-alto-protocol-13] "ALTO Protocol", R. Alimi Ed., R. Penno Ed; Y. Yang Ed., draft-ietf-alto-protocol-13.txt (work in progress), Sep. 7, 2012.

As will be explained with more detail later, there is a need to improve optimization of application layer traffic using e.g. ALTO service.

Embodiments of the present invention in particular address such needs.

These and other objects are achieved, in one aspect, by a method for optimization of application layer traffic carried by an IP connection over a multi-access technology mobile network between a User Equipment UE and an IP connection endpoint in an IP network, said optimization being based on network information provided using a network information service, said network information including path costs capable of indicating preferences in terms of network paths for said IP connection, said preferences in terms of network paths including preferences in terms of access technologies.

These and other objects are achieved, in other aspects, by different entities for performing related steps of such method. Such entities may include, in particular, User Equipment UE, network information Server such as ALTO Server (including Local Server and Core Server), network information Client such as ALTO Client (including Local Client and Core Client), network information Agent, mobile network entity interacting with UE at PDN connectivity establishment.

Some embodiments of apparatus and/or methods in accordance with embodiments of the present invention are now described, by way of example only, and with reference to the accompanying drawings, in which.

The Internet usage market is now geared towards massive downloads any time anywhere, seamlessly coupled with mobility. At the same time network operators want to offer easy access to popular content, as they progressively get to operate themselves the delivery and management of content. These applications are highly demanding on Quality of Experience (QoE) which is how the user perceives the quality of an application session in terms of e.g. latency, throughput or packet loss. The challenge now for the mobile network operators is to provide QoE to their customers while minimizing the costs induced in their network operation.

As broadband greedy and highly bursty sessions can be initiated arbitrarily, they need to be well prepared and maintained. Evolved Packet Systems (EPS), also referred to as LTE networks, support connections to the Internet via different possible access technologies, whose capabilities significantly impact the QoE and the network performance. Applications running on mobile terminals could improve them if they could choose their Endpoints with awareness of the network topology spanning from the access to the whole Internet. That is, terminals need to be aware of routing costs of both their end to end connection and their path to the PDN Gateway.

3GPP has specified the Evolved Packet Core (EPC), which is the next generation core network for cellular networks. The EPC defines the following key functions: the Serving Gateway (S-GW), the PDN Gateway (P-GW) and the Mobility Management Entity (MME). These three functions cooperate with the security Home Subscriber Server (HSS) and Policy and Charging Control (PCC) infrastructure, in order to rule the traffic forwarding capabilities of the core and access network. In particular, the EPC provides wireless access to non 3GPP networks such as WIFI. 3GPP already specified the non 3GPP non trusted WLAN access by means of the evolved Packet Data Gateway (ePDG), a VPN concentrator where each UE has to connect via a secured connection. Similar work has started to define WIFI access also for non 3GPP trusted networks (also referred as trusted WIFI access). Each wireless access technology has particular capabilities and limitations and therefore yields a different access cost.

To improve its QoE for applications such as video download or streaming, the UE may use the IETF ALTO protocol, described in [draft-ietf-alto-protocol-13] and whose design goal can help it to choose the best possible resource location. Indeed, the IETF ALTO working group provides guidance to content delivery applications such as P2P or Content Delivery Networks (CDN), which have to select one or several hosts or endpoints from a set of candidates that are able to provide a desired data resource. This guidance should be based on parameters that affect performance and efficiency of the data transmission between the hosts, e.g., the topological distance. The ultimate goal is to improve the QoE of the application while reducing resource consumption in the underlying network infrastructure. To this end, ALTO Servers deployed by Network Operators (NO), provide requesting ALTO Clients with information, currently such as the NO-centric view on the network topology, the candidate endpoints with attributes such as their routing cost or connectivity type.

Figure 1:
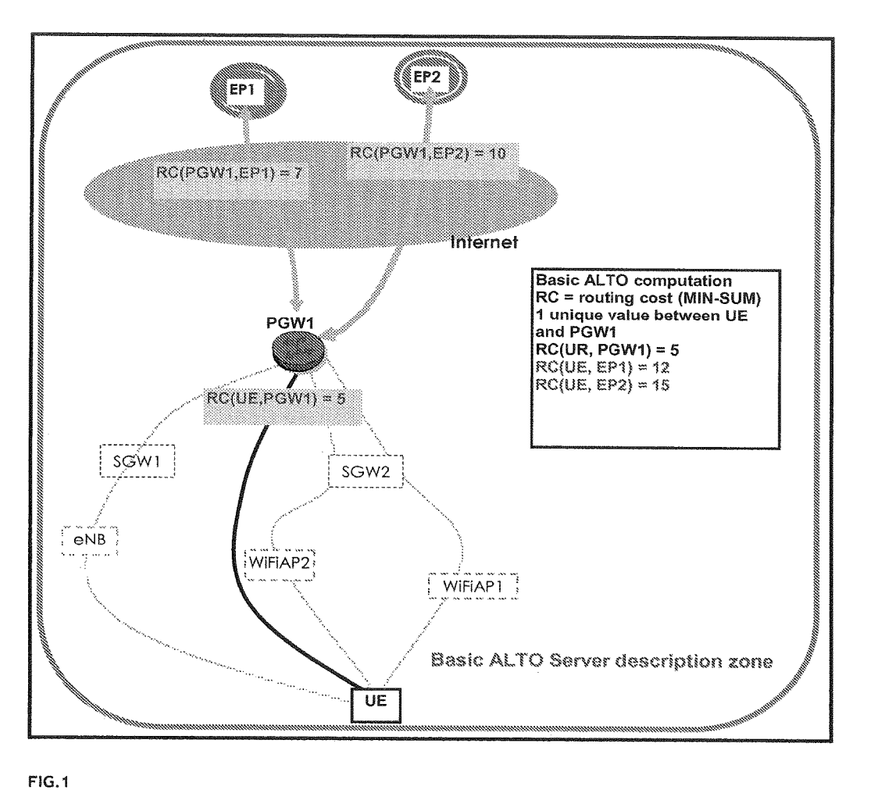
FIG. 1 illustrates, for an example of mobile network infrastructure and an example of application allowing a choice in connection endpoint, a possible solution for traffic layer optimization having certain drawbacks that embodiments of the present invention enable to avoid.

Currently the insight of ALTO information in the path between a UE and a connection node (or say Endpoint) does not provide details below IP hops among others for scalability reasons, as it is illustrated in FIG. 1. However the major QoE challenges of wireless network users arise in the access network, that is, in the first hop between the UE and its one or more serving PGW. The path of a UE to its serving PDN(s) impacts the path to the content and thus the related QoE. Therefore, it is necessary to inform the UE, which could take the appropriate decisions w.r.t. the utilized access path.

For Mobile Network Operators (MNO) and their users, being connected via 3G or trusted Wifi can make a huge difference in the QoE and routing cost. MNOs also seek to optimize their network load balance.

For both parties there is a need to push access technology (AT) awareness of ALTO information one step ahead, in order to either enable ALTO aware inter RAT handovers or RAT aware Endpoint selection for Users located in wireless network.

Embodiments of the present invention provide applications running on mobile terminals with information on end to end routing costs to their Endpoints with awareness on the access technology costs given that this information should at the same time preserve scalability.

Embodiments of the present invention provide a layer cooperative solution to help managing the connections of a mobile User Equipment (UE), running applications that have the choice among multiple candidate endpoints, such as content downloading or distributed applications. Embodiments of the present invention provide means to evaluate the cost associated to the choice of a given Correspondent Node (CN) in the Internet, accounting for both the access path and the end to end path. While doing that, embodiments of the present invention are designed so as to preserve scalability.

Embodiments of the present invention involve the IETF protocol Application Layer Traffic Optimization (ALTO) and would benefit from extensions of the current ALTO protocol.

Embodiments of the present invention propose that ALTO provides cost values depending on the access technology used at the first hop. Embodiments of the present invention require that the ALTO request is made with the awareness of the applicable cost value category.

Embodiments of the present invention propose means for the UE to provide its connection attributes so that the ALTO Client can request the appropriate cost value for the path to the PGW.

To maintain scalability, embodiments of the invention assume that the ALTO coverage zone is decomposed in one "local" part covering the first hop range and the other part, the rest of the ISP network view.

Last, it should be noted that current ALTO protocol and extension proposals do not support multiple possible values for a path cost metric (at the same time period), that is, costs that can take different possible values depending on qualitative parameters such as access technology as opposed to quantitative parameters like time or space. Embodiments of the present invention require an ALTO protocol extension proposal allowing to categorize ALTO cost Values Suppose that an ALTO Client needs to request the cost of a path between a user equipment (UE), located in an EPS, and an application Endpoint (EP) located in the Internet. To this end, it requests the ALTO Endpoint Cost Service (ECS).

We assume that the ALTO Server providing information to the UE is the ALTO Server operated by the ISP where the UE is a subscriber. The ALTO ECS provides the cost of the end to end path between a UE and a connection node (CN) associated to the EP. In LTE networks, the last hop of this path is the logical link between the UE and the PGW that physically goes via several possible access technologies. For example: a cellular base station, a trusted WiFi Access Point, an untrusted WiFi access point.

Embodiments of the present invention are called here "Extended ALTO Cost Services (EACS) Support"; this focuses on the ALTO information provided for this last hop and proposes mechanisms to merge last hop path costs with end to end path cost in a scalable way. Embodiments of the present invention provide support features to EACS specialized in Mobile Network path costs. Their goal is to enable a MNO to help its hosted UEs applications to choose their EPs with the awareness of their path to their serving PGW.

Figure 2:
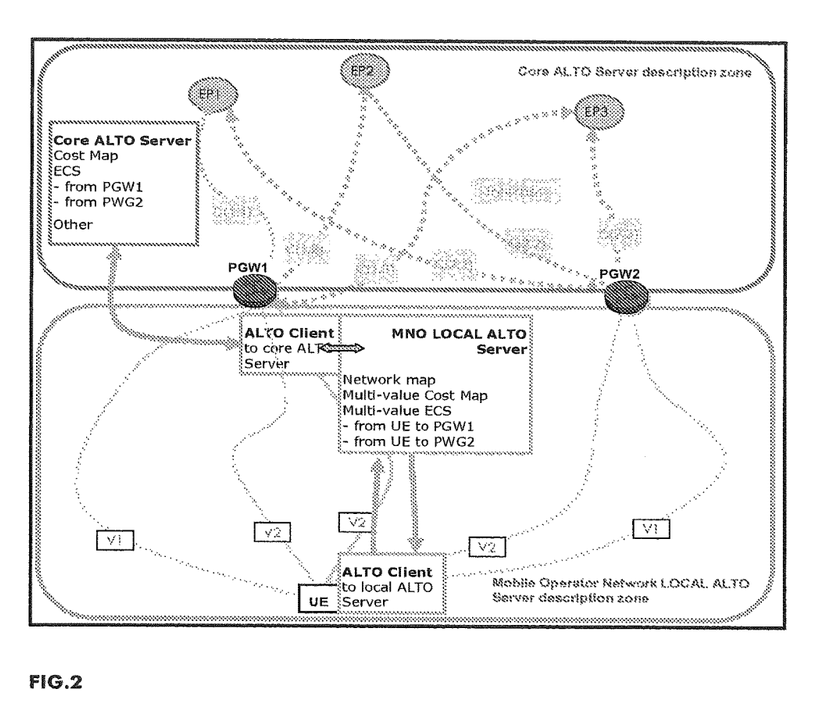
FIG. 2 illustrates, for an example of mobile network infrastructure and an example of application allowing a choice in connection endpoints, an example of network information service architecture according to embodiments of the present invention.

An example of EACS Support features is illustrated in FIG. 2:

The ALTO Client serving the UE has some EACS option, allowing it to choose the cost value w.r.t. a name identifying this cost value in a qualitative way and specified in the ALTO Server. Example names include: "cellular", "3g", "trusted-Wifi".

The ALTO Service is preferably distributed among 2 ALTO Servers as follows:
 (1) a Local Serving ALTO Server (LAOS) that:
  (ii) Hosts the information on the local EPS network, covering the paths between the UEs and the PGWs. Provides information on the paths from the UE to the PGW.
  (iii) Hosts an ALTO Client that sends an ALTO request to a "general" ALTO Server, covering the zone beyond the PGW. It can possibly get the requested information from a local cache if still valid.
  (i) receives the ALTO request issued by the ALTO Client Serving the UE.

(2) a "core" or "regular" ALTO Server that covers the whole ISP network view, as it would if the "local ALTO Service" is not available or deactivated. This would be the case ALTO Client Serving the UE does not have or use the EACS option.

The ALTO Client serving the UE is referred to as the LAOC can be located either in the UE or in the network.

EACS Support provides two new features:
providing the UE and Local ALTO Client with the address of the Serving Local ALTO Server, e.g. when the PDN connectivity or PDP context is established,
allowing a UE to give its connection attributes to a function associated to the Local ALTO Client in order to get the ALTO Cost information relatively to the UE's connection type, where:
  (i) the connection attributes are received by a function called for instance ALTO Agent. This function is located in the UE and associated to the ALTO Client; it maps the connection attributes to the Cost Value Names registered in the ALTO Server and sends them to the ALTO Client. The ALTO Agent is out of scope of the ALTO protocol; it is aware of semantics of (a) ALTO, (b) UE and (c) application.

Figure 3:
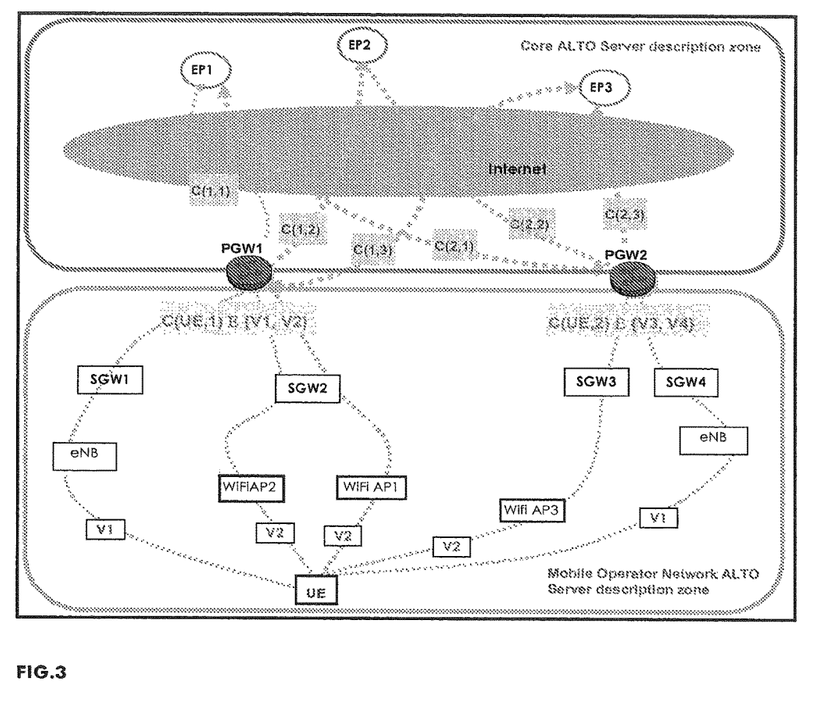
FIG. 3 illustrates, for an example of mobile network infrastructure and an example of application allowing a choice in connection endpoint, an example of network information service according to embodiments of the present invention.

This way, the ALTO Client can send an ALTO request for the appropriate ALTO Cost Value Name FIG. 3 provides an example on how a Local ALTO Server can represent logical paths costs w.r.t. to their access technology.

Figure 4:
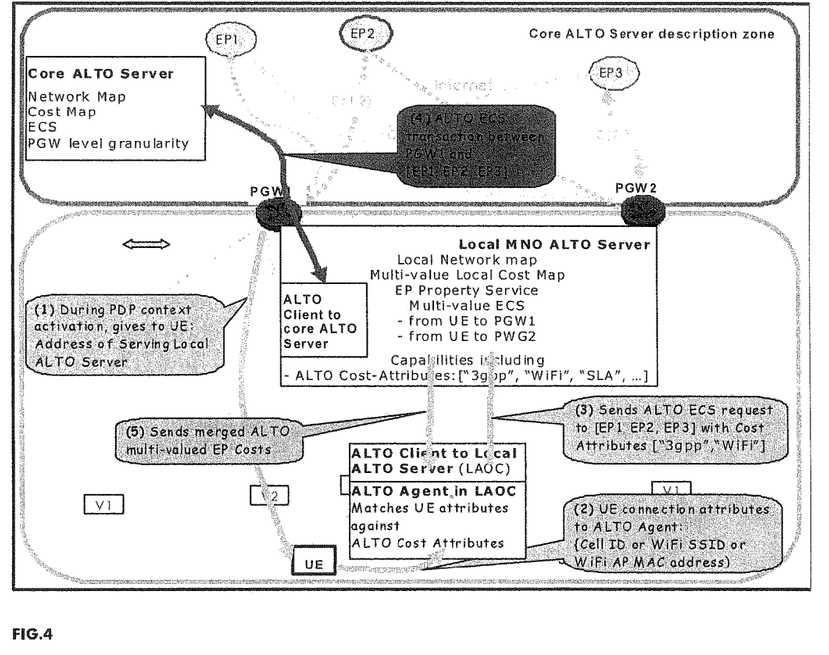
FIG. 4 illustrates, for an example of mobile network infrastructure and an example of application allowing a choice in connection endpoint, an example of steps which may be performed according to embodiments of the present invention.

An example of steps and features that may be used when implementing Extended ALTO Cost Services with EACS Support is illustrated in FIG. 4

Features

A) A "Local MNO ALTO Server" (LAOS) covers the EPS and provides fine grained information on the EPS path that is the first IP hop between a UE and a PGW.

B) The UE is related to a Local ALTO Client (LAOC) that may be embedded in the UE or located in the EPS.

C) An ALTO Client, whether local or not is preferably coupled with an ALTO Agent (AA), that is a functional entity able to (i) get information related to the UE, the application or other context (ii) map this information to the ALTO semantics and hand it to the AOC as input to prepare ALTO requests (iii) hand other ALTO request input such as ALTO cost type ID (iv) possibly perform some processing on the information received in the ALTO responses, such as providing optimization parameters, filtering or reverse mapping.

D) The LAOS embeds another AOC that handles ALTO requests to one or more ALTO Servers located in the Core Network and providing "regular" ALTO Services. The ALTO information on the EPS path is provided by the LAOS, the ALTO information on the Core Network path is retrieved from the Core AOS via the AOC embedded in the local AOS.

E) The Local ALTO routing cost information, or any other applicable ALTO cost information, is sensitive to connection attributes including RAT type (3gpp, trusted WiFi), SLA. So that the cost of an EPS path may take different values, depending on the connection attributes of the UE.

F) The Local ALTO cost values that are sensitive to the UE connection attributes are identified in the LAOS by an ALTO Cost Value Name. For example: ALTO cost value names may include {"3gpp", "trusted WiFi", "SLA tag", . . . }.

G) The applicable ALTO Service is in the present case, the ALTO Endpoint Cost Service (ECS).

Extended Alto Cost Transaction Steps

1) The UE and Local ALTO Client get the address of the Serving Local ALTO Server, e.g. when the PDN connectivity or PDP context is established.

2) The UE gives its connection attributes to the LAOC, preferably via the LAA, together with the other "regular" attributes of an ALTO Endpoint Cost Service request. The UE connection attributes are identifiers that unambiguously characterize ALTO cost value properties. For example: Cell ID for "3gpp", "SSID" or WiFi Access Point MAC address for "tWiFi", SLA class or ID.

3) The Local ALTO Agent (LAA) matches the UE connection attributes with the identifiers of the ALTO Cost Value Names advertised in the ALTO Server Information Resources Directory (IRD). It gives the ALTO Cost value Names to the Local ALTO Client (LAOC) together with the other ALTO request attributes.

4) The Local ALTO Server (LAOS) separates the received ALTO request in 2 parts: the first one for the EPS path between UE and PGW that it covers and the second one for the Core Network (CN) path between PGW and EPs covered by the core ALTO Server. It gets the cost of the path between the UE and the PGW from its own database. It gets the cost in the core network either via an ALTO request to the core ALTO Server or gets the locally cached response if still valid.

5) It merges the response of the core Serving ALTO Server and the LAOS and sends it back to the ALTO Client. The attribute "ALTO Cost Value Name" does not yet exist in the ALTO protocol. It would require a protocol extension, that introduces this attributes to support e.g. examples of use cases as described here.

Example of embodiment (called EMBODIMENT 1): UE connected via 3gpp requesting ECS to EP1, EP2, EP3 for ALTO Cost Value Names "3gpp" and "wifi", for ALTO Cost Type 'routingcost'. LAOC is embedded in the UE Steps characterizing UE connection centric Multi-Value ALTO ECS transaction:

(1) During PDN connectivity establishment or PDP context activation, UE gets: Address of Serving Local ALTO Server,
(2) UE provides connection attributes to ALTO Agent: for example {Cell ID or WiFi SSID or WiFi AP MAC address)
  ALTO Agent: (i) maps Cell ID with ALTO Value Name "3gpp" and Wifi SSID with "WiFi", (ii) sends IP address of EP1, EP2, EP3 and other ECS input including e.g. "Cost Type=routingcost" to Local ALTO client (LAOC),
(3) LAOC sends to LAOS: ALTO EACS request from @UE to [@EP1, @EP2, @EP3] with Cost Value Name ["3gpp", "WiFi"], and the other necessary ALTO request attributes.
(4) LAOS:
  (i) decomposes the ALTO request: UE to PGW and PGW to EPs.
  (ii) through its embedded ALTO Client, requests and gets from the Core ALTO Server via the Endpoint Cost Service, the "routingcost" value from PGW to [@EP1, @EP2, @EP3], or gets the cached response if still valid,
  (iii) gets from its database via the EACS the routing cost value from the UE to PGW, for ALTO value names ["3gpp" and "WiFi".
(5) sends to the LAOC the merged ALTO response from UE to EPs, that is for each of the 3 paths, two values.

The step 4.ii may be done as currently specified in the base ALTO protocol.

LAOC can request values for one or more ALTO Value names. Embodiments of the present invention relate to the possibility to request and get values for one or more Value names.

Figure 5:
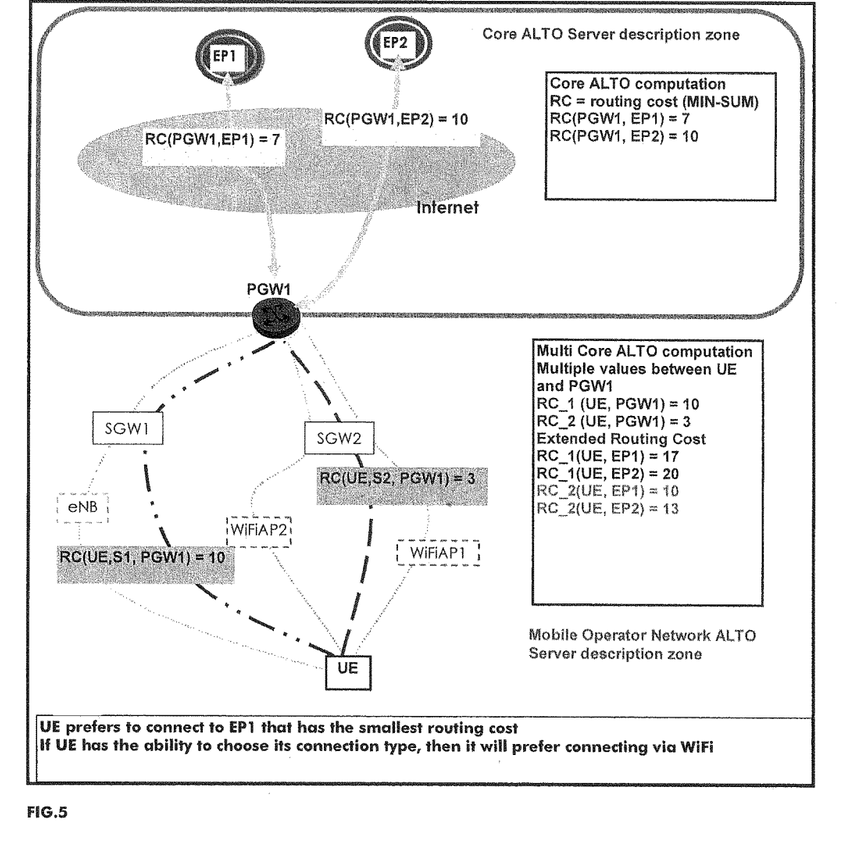
FIG. 5 illustrates, for an example of mobile network infrastructure and an example of application allowing a choice in connection endpoint, examples of path costs values using a network information service according to embodiments of the present invention.

How path cost values can be decomposed and merged by the LAOS is illustrated in FIG. 5.

Example of embodiment (called EMBODIMENT 2)—EACS support for achieve multi-variate Endpoint and path selection; LAOC is embedded in the UE.

As illustrated in FIG. 5, the UE can already select its EP with awareness of the access technology and thus for instance switch between cellular and Wifi while keeping an eye on its routing cost to its application endpoints.

Beyond that, EACS Support offers the possibility to add another step towards optimized QoE, OPEX and load balancing, in particular as EACS can be efficiently used in conjunction with several ALTO Cost Types. Multi valued ALTO costs offer means to jointly select application Endpoints and access paths. Distinct paths can further be distinguished by adding other cost metrics such as bandwidth related ones, given that it does not make sense to "merge" bandwidth values of 2 different paths into a single value, as it is done in FIG. 1.

Figure 6:
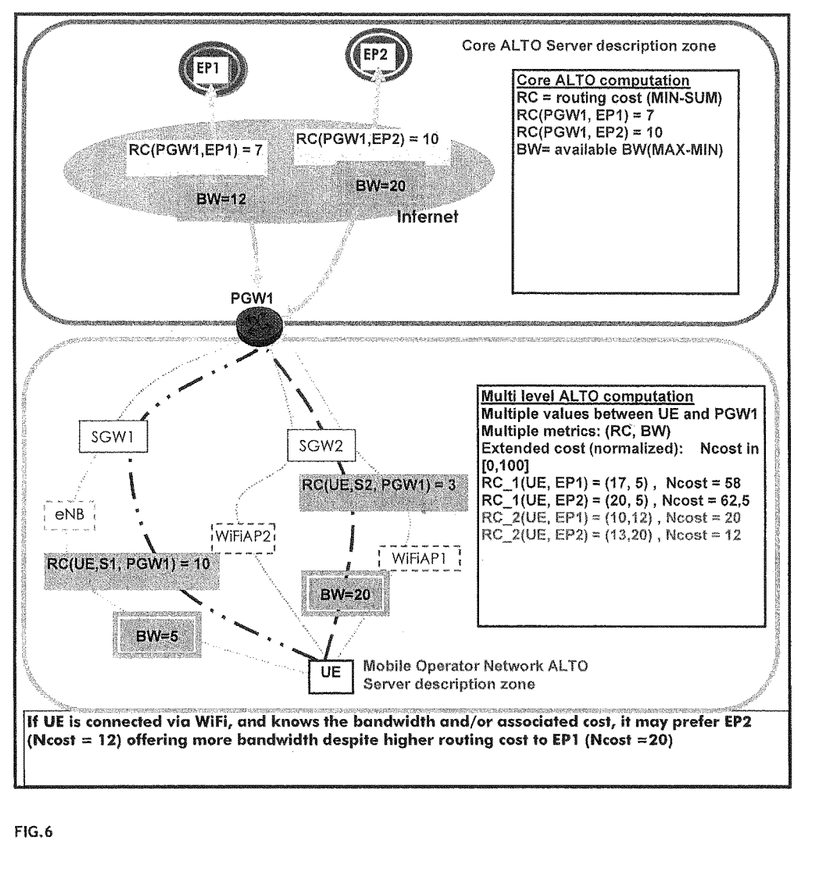
FIG. 6 illustrates, for an example of mobile network infrastructure and an example of application allowing a choice in connection endpoint, examples of path costs values using a network information service according to embodiments of the present invention.

FIG. 6 illustrates how the joint use of routing cost and bandwidth cost allows an even more advantageous choice of Endpoint, than with 2 cost values but only one cost type, as in FIG. 5. In FIG. 6, besides routing cost values, a value tagged as BW and reflecting the available bandwidth is provided. The "concatenated" bandwidth value over a path is equal to the minimal value. This yields 4 cost vectors and thus 4 "Endpoint plus path" choices. It is assumed that the corresponding ALTO cost is an abstracted value that is inversely proportional to the available bandwidth. A normalized cost value (between 0 and 100) is computed for each of the 4 choices and tagged "Ncost". Looking at FIG. 6, one sees that the least cost solution (Ncost=12) corresponds to choosing EP2 via SGW2 (wifi access), that has a slightly higher routing cost (RC=13) but a significantly higher bandwidth (BW=20). Using only routing cost would have led to choose EP1 (RC=10 and BW=12) via SGW2.

Thus, the EACS support features enable an efficient and scalable extension of the ALTO protocol in order to better choose the application Endpoints, for instance via the use of multiple cost types. EACS support enables to jointly optimize the selection of network access and Endpoint. It allows as well an easy use of mechanisms to update Endpoint selection upon a network access selection.

In one aspect, there is provided a method for optimization of application layer traffic carried by an IP connection over a multi-access technology mobile network between a User Equipment UE and an IP connection endpoint in an IP network.

Various embodiments are provided, which may be used alone or in combination, according to various combinations.

In an embodiment, said optimization is based on network information provided using a network information service, said network information including path costs capable of indicating preferences in terms of network paths for said IP connection, said preferences in terms of network paths including preferences in terms of access technologies.

In an embodiment, connection attributes identifying said access technologies are provided by said UE for use by said network information service.

In an embodiment, connection attributes identifying said access technologies at mobile network level are mapped to path costs attributes identifying said access technologies at network information service level.

In an embodiment, for a Client-Server based network information service, a request sent by said Client to said Server includes path costs attributes identifying said access technologies.

In an embodiment, for a Client-Server based network information service, a response sent by said Server to said Client includes different path costs values for different path costs attributes identifying different access technologies.

In an embodiment, said preferences in terms of network paths further include preferences in terms of IP connection endpoints for an application allowing a choice in IP connection endpoint.

In an embodiment, said preferences in terms of network paths further include preferences in terms of IP connection endpoints for an application allowing a choice in IP connection endpoint, and wherein, for a Client-Server based network information service, a response sent by said Server to said Client includes different path costs values for different combinations of IP connection endpoint addresses and different path cost attributes identifying different access technologies.

In an embodiment, for a Client-Server based network information service, said Server is distributed among two Servers: a Local Server providing path costs capable of indicating preferences in terms of mobile network paths, and a Core Server providing path costs capable of indicating preferences in terms of IP network paths.

In an embodiment, for a Client-Server based network information service, said Server is distributed among two Servers: a Local Server providing path costs capable of indicating preferences in terms of mobile network paths between said UE and a mobile network gateway via different access technologies, and a Core Server providing path costs capable of indicating preferences in terms of IP network paths between said mobile network gateway and different IP connection endpoints for an application allowing a choice in IP connection endpoint.

In an embodiment:
address information of a serving Local Server is provided to said UE, such as at IP connectivity establishment by a mobile network entity interacting with said UE at said PDN connectivity establishment.

In an embodiment:
connection attributes identifying said access technologies at mobile network level are provided by said UE to a mobile network information service Agent associated with said UE.

In an embodiment:
connection attributes identifying said access technologies at mobile network level are mapped by a mobile network information service Agent associated with said UE to path costs attributes identifying said access technologies at mobile network service information level.

In an embodiment:
a request sent by a Local Client to said Local Server includes path cost attributes identifying said access technologies.

In an embodiment:
said Local Server, upon receiving a request including path cost attributes identifying said access technologies, sending a request for IP network path costs to said Core Server through a Core Client coupled to said Local Server or getting cached IP network path costs if still valid, and getting mobile network path costs from a database associated with said Local Server.

In an embodiment:
    a response including mobile network path costs merged with IP network path costs is sent by said Local Server to a Local Client.

In an embodiment, said path costs further include bandwidth costs capable of indicating preferences in terms of bandwidth.

In other aspects, there are provided different entities for performing related steps of such method. Such entities may include, in particular, User Equipment UE, network information Server such as ALTO Server (including Local Server and Core Server), network information Client such as ALTO Client (including Local Client and Core Client), network information Agent, mobile network entity interacting with UE at PDN connectivity establishment.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for optimization of application layer traffic carried by an IP connection over a multi-access technology mobile network between a User Equipment (UE) and an IP connection endpoint in an IP network, said optimization being based on network information provided using a Client-Server based network information service, said method comprising:
    receiving a request for said network information sent by a Local Client including path costs attributes identifying access technologies at a network information service level, said path costs attributes being mapped from connection attributes identifying said access technologies at a mobile network level, said connection attributes being provided by said UE for use by said network information service;
    receiving IP network path costs provided by a Core Server, said IP network path costs indicating preferences in terms of IP network paths;
    merging said IP network path costs with mobile network path costs provided by a Local Server, said mobile network path costs indicating preferences in terms of mobile network paths; and
    sending a response to said request for said network information to said Local Client, said network information including different path costs values for different path costs attributes identifying different access technologies based on said merging, said network information including path costs capable of indicating preferences in terms of network paths for said IP connection, said preferences in terms of network paths including preferences in terms of access technologies.

2. The method according to claim 1, wherein said preferences in terms of network paths further include preferences in terms of IP connection endpoints for an application allowing a choice in IP connection endpoint.

3. The method according to claim 2, wherein the response sent to said Local Client includes different path costs values for different combinations of IP connection endpoint addresses and different path costs attributes identifying different access technologies.

4. The method according to claim 1, wherein, for said Client-Server based network information service, said Server is distributed among said Local Server and said Core Server.

5. The method according to claim 4, further comprising:
    said Local Server providing said path costs capable of indicating preferences in terms of mobile network paths between said UE and a mobile network gateway via different access technologies, and
    said Core Server providing said path costs capable of indicating preferences in terms of IP network paths between said mobile network gateway and different IP connection endpoints for an application allowing a choice in IP connection endpoint.

6. The method according to claim 4, wherein address information of said Local Server is provided to said UE at IP connectivity establishment by a mobile network entity interacting with said UE at PDN connectivity establishment.

7. The method according to claim 4, wherein said connection attributes identifying said access technologies at said mobile network level are provided by said UE to a mobile network information service Agent associated with said UE.

8. The method according to claim 7, wherein said connection attributes identifying said access technologies at said mobile network level are mapped by said mobile network information service Agent associated with said UE to said path costs attributes identifying said access technologies at said network information service level.

9. The method according to claim 4, wherein said request is sent by a Local Client to said Local Server.

10. The method according to claim 9, further comprising said Local Server, upon receiving said request, sending a request for said IP network path costs to said Core Server through a Core Client coupled to said Local Server or getting cached IP network path costs if still valid, and getting mobile network path costs from a database associated with said Local Server.

11. The method according to claim 4, wherein said response including said mobile network path costs merged with said IP network path costs is sent by said Local Server to said Local Client.

12. The method according to claim 1, wherein said path costs further include bandwidth costs capable of indicating preferences in terms of bandwidth.

13. A network device for optimization of application layer traffic carried by an IP connection over a multi-access technology mobile network between a User Equipment (UE) and an IP connection endpoint in an IP network, said optimization being based on network information provided using a Client-Server based network information service, said network device comprising:
    at least one memory storing computer-readable instructions; and
    at least one computer processor configured to execute said computer-readable instructions to,
        receive a request for said network information sent by a Local Client including path costs attributes identifying access technologies at a network information service level, said path costs attributes being mapped from connection attributes identifying said access technologies at a mobile network level, said connection attributes being provided by said UE for use by said network information service;

receive IP network path costs provided by a Core Server, said IP network path costs indicating preferences in terms of IP network paths;

merge said IP network path costs with mobile network path costs provided by a Local Server, said mobile network path costs indicating preferences in terms of mobile network paths; and send a response to said request for said network information to said Local Client, said network information including different path costs values for different path costs attributes identifying different access technologies based on said merging, said network information including path costs capable of indicating preferences in terms of network paths for said IP connection, said preferences in terms of network paths including preferences in terms of access technologies.

\* \* \* \* \*